Patented July 27, 1954

2,684,911

UNITED STATES PATENT OFFICE 2,684,911

PHOTOSENSITIVELY OPACIFIABLE GLASS

Stanley Donald Stookey, Corning, N. Y., assignor to Corning Glass Works, Corning, N. Y., a corporation of New York No Drawing. Application August 30, 1951, Serial No. 244,478

13 Claims. (Cl. 106—52)

This invention relates to photosensitively opacifiable glass, that is, glass in which exposure to short-wave radiations, such as ultraviolet radiations, brings about an invisible change, as a result of which irradiated areas are capable of heat-developed opacification while non-irradiated areas remain substantially unchanged on heating.

In my prior application Serial No. 695,801, filed September 9, 1946, now Patent No. 2,515,940, issued July 18, 1950, I have described a silicate glass of this type containing 10–25% $Li_2O$ and a primary photosensitizing agent comprising gold, silver or copper equivalent to 0.004–0.05% Au, 0.025–0.3% AgCl or 0.04–1% $Cu_2O$, wherein exposure to short-wave radiations followed by heating produces in such exposed portion an opacified image formed by the precipitation of opacifying crystallites of lithium disilicate.

Recently I have found that the opacified portion of such a glass is more soluble in dilute hydrofluoric acid than the clear unexposed portion and that such opacified portion can thereby be completely dissolved while the clear portion remains only slightly affected. (Such difference in solubility, hereinafter referred to as the solubility differential, can be determined as follows: A small polished plate of the glass having an opacified portion and a clear portion is immersed in a stirred solution of dilute hydrofluoric acid (for example, 10% by weight) at room temperature. At given intervals (for example, 15-minute) the plate is removed, rinsed with water, and the thicknesses of the opacified and the clear portions are measured. The ratio of the change in thickness of each portion to the elapsed etching time is taken as the etching rate of that portion. The ratio of the etching rates of the opacified and the clear portions is the solubility differential of the glass.)

In an article made of such glass the opacified image is three-dimensional and may, if desired, extend completely through the glass. Its removal therefore leaves a corresponding depression or hole in the glass. Designs and filigrees of various sorts, including those heretofore either impossible to achieve or requiring long and laborious mechanical grinding, can by such means easily and quickly be carved in glass. Such chemical machining or sculpturing of glass forms the subject matter of another application of mine, Serial No. 244,477, filed concurrently herewith, now Patent No. 2,628,160 issued February 10, 1953.

The present invention is predicated upon my discovery of means for increasing the photosensitivity and the solubility differential of such prior glass, whereby the chemical machining or sculpturing of such glass by the process above referred to is greatly improved. The new photosensitively opacifiable glass according to this invention is produced by melting under reducing conditions and comprises essentially 70% to 85% $SiO_2$, the indicated proportion of at least one alkali metal oxide selected from the group consisting of 9% to 15% $Li_2O$, up to 8% $Na_2O$, up to 8% $K_2O$ and up to 8% of a mixture of $Na_2O$ and $K_2O$, the selected alkali metal oxide including $Li_2O$, the total alkali metal oxide content being 9% to 23%, and 0.001% to 0.020% of silver computed as AgCl, such essential constituents totaling at least 84%. Advantageously, up to 10% $Al_2O_3$ and up to 0.05% $CeO_2$ are included in such glasses. Preferably, the present glass consists essentially of 78% to 83% $SiO_2$, 10% to 13% $Li_2O$, 2% to 5% $K_2O$, up to 10% $Al_2O_3$, 0.001% to 0.020% of silver computed as AgCl, and 0.005% to 0.05% $CeO_2$.

The outstanding features of the new glass are its unusually low silver content as compared with the glass of my prior Patent No. 2,515,940, which contains at least 0.025% of silver computed as AgCl, and the fact that it is melted under mild reducing conditions. It was previously believed that photosensitive glasses containing silver could not be melted under reducing conditions but must be melted under oxidizing conditions because it was known that when such glasses containing the amounts of silver heretofore employed are melted under reducing conditions, they are not photosensitive. While this is true for such glasses which contain 0.025% or more of silver computed as AgCl, I have now found that, unexpectedly, glasses in the above-recited range of compositions not only must be melted under reducing conditions in order to be photosensitive, but when so melted exhibit a greater photosensitivity than the prior glasses. Of course the lower silver content of the new glasses also represents a substantial saving in cost.

I have also found that a glass having a composition within the above-recited range and containing $K_2O$ possesses a greater solubility differential than such glasses which contain no $K_2O$, and that the solubility differential is still greater for glasses which contain $K_2O$ but no $Na_2O$. Such unexpected increase in the solubility differential, it is believed, may be explained as follows:

X-ray analyses of such glasses, which have been exposed to short-wave radiations and subsequently heat-developed in accordance with the procedure generally described in my prior Patent No. 2,515,940, indicate that when $K_2O$ is absent the precipitated opacifying crystallites in the glass include a major proportion of lithium disilicate and only a small proportion, if any, of lithium monosilicate together with substantial proportions of quartz and cristobalite. However, when $K_2O$ is present the proportion of lithium monosilicate is substantially larger and increases as the proportion of $K_2O$ is increased. When $K_2O$ but no $Na_2O$ is present, the opacifying crystallites may consist exclusively of lithium monosilicate. Since the solubility of lithium monosilicate in dilute hydrofluoric acid is much greater than that of lithium disilicate and quartz and cristobalite, such increase in the proportion of lithium monosilicate greatly increases the solubility differential of the glass.

While either gold, silver, or copper may be used as the primary photosensitizing agent in the glasses of my prior Patent No. 2,515,940, silver is preferred for such purpose in the present glasses. The reduction melting required for these glasses causes precipitation of gold and thereby loss of photosensitivity; and copper requires too strong a reduction to be suitable for the present purpose.

Only the indicated ranges of constituents produce glasses which yield the desired result, and variations in the proportions of such constituents should be confined within the limits of such ranges for the following reasons:

With less than 70% $SiO_2$ the glass per se is too soluble and the solubility differential is objectionably low. $Al_2O_3$ increases the solubility differential and is desirably present. In amounts less than 10% it decreases the devitrification tendency. On the other hand, an excess of $SiO_2$ or $Al_2O_3$ makes the glass hard to melt and prone to devitrify throughout during melting or working or subsequent heat treatment.

A deficiency of $Li_2O$ or an excess of $Na_2O$ or $K_2O$ results in a glass which will not develop a suitable opacity on exposure and subsequent heat treatment. An excess of either $Li_2O$ or $Na_2O$ or $K_2O$ raises the solubility of the glass and objectionably lowers the solubility differential.

Either an excess or a deficiency of silver or an excess of $CeO_2$ lowers the photosensitivity of the glass objectionably.

The following compositions in weight percentage which are calculated to the oxide basis from their batches illustrate glasses falling within the scope of my invention:

|         | I     | II    | III   | IV    | V     | VI    | VII   | VIII  | IX    |
|---------|-------|-------|-------|-------|-------|-------|-------|-------|-------|
| $SiO_2$ | 77.5  | 85    | 82.5  | 82.5  | 80    | 79    | 72.5  | 80    | 81.5  |
| $Li_2O$ | 12.5  | 10    | 12.5  | 12.5  | 12.5  | 9     | 12.5  | 12.5  | 12    |
| $Na_2O$ |       |       | 2.5   |       | 7.5   | 2     |       |       |       |
| $K_2O$  |       |       |       | 2.5   |       | 2.5   | 5     | 5     | 3.5   |
| $Al_2O_3$ | 10  | 5     | 2.5   | 2.5   |       | 7.5   | 10    | 2.5   | 3.0   |
| AgCl    | 0.002 | 0.002 | 0.006 | 0.006 | 0.002 | 0.002 | 0.002 | 0.002 | 0.002 |
| $CeO_2$ | 0.02  | 0.02  | 0.003 | 0.02  | 0.02  | 0.02  | 0.02  | 0.02  | 0.02  |

The above compositions are melted under reducing conditions by including in the respective batches therefor a small amount of starch equivalent, for example, in composition VI when melted in a crucible, to about 0.35% of the composition on the oxide basis. Since the starch is completely eliminated from the glass during melting, it is not included in the final compositions given above. The proportion of starch or other reducing agent which produces the desired result will vary with the glass composition, too much reduction causing precipitation of the silver, a condition which is to be avoided. Less reducing agent is required for melting in a closed melting container than for melting in an open melting container, such as a tank. The exact amount of reducing agent for all conditions cannot be stated, but for each condition it can readily be determined by trial.

As will be understood, the value of the solubility differential of the glass will depend in part on the composition of the glass and its reduction, and also on the time and intensity of the exposure and the temperature and duration of the subsequent heat treatment.

For instance, a small polished plate made of composition III was selectively exposed through a window-glass filter 3 mm. thick for 6 minutes at a distance of one foot from a 60-amp. arc using "Sunshine" carbon electrodes manufactured by The National Carbon Company, and subsequently heat developed for 1 hour at 650° C. These were the optimum conditions for maximum opacification of composition III. The etching rates of the opacified and unopacified portions were determined by etching the plate in a stirred 10% by weight solution of hydrofluoric acid at room temperature. The resulting solubility differential was 23 to 1.

A similar plate made of composition IV was treated in the same manner except that, due to the difference in composition and a slight difference in the amount of reduction of this glass as compared to composition III, it was exposed 80 minutes and was heated 2 hours at 640° C. in order to obtain maximum opacification. The resulting solubility differential of this glass was 46 to 1.

The inclusion of other metal oxides in the compositions of this invention has no particular advantage. In any event, such oxides should not exceed a total of 6% for the following reasons:

The bivalent metal oxides, that is, oxides of metals of the second periodic group and of lead, if present, should not exceed a total of 3% because such metals form insoluble fluorides during the hydrofluoric acid treatment or cause devitrification throughout the glass. Insoluble fluorides slow the solvent action of the hydrofluoric acid and thus decrease the effective solubility differential when the glass is treated therewith.

Boric oxide, if present, should not exceed 2 to 3% because in greater amounts it tends to cause devitrification throughout the glass.

Since $SnO_2$ increases the reducing action of the reducing agent, its presence should be avoided.

What I claim is:

1. A reduced glass comprising essentially 70–85% $SiO_2$, 9–15% $Li_2O$, the indicated proportion of at least one alkali metal oxide selected from the group consisting of up to 8% $Na_2O$, up to 8% $K_2O$ and up to 8% of a mixture of $Na_2O$ and $K_2O$, the total alkali metal oxide content being 9% to 23%, and 0.001% to 0.020% of silver computed as AgCl, the essential constituents totaling at least 84%, said glass being photosensitively opacifiable.

2. A reduced glass comprising essentially 70–85% $SiO_2$, 9–15% $Li_2O$, the indicated proportion of at least one alkali metal oxide selected from the group consisting of up to 8% $Na_2O$, up to 8% $K_2O$ and up to 8% of a mixture of $Na_2O$ and $K_2O$, the total alkali metal oxide content being 9% to 23%, and 0.001% to 0.020% of silver computed as AgCl, the essential constituents totaling at least 84%, and up to 10% $Al_2O_3$ and up to 0.05% $CeO_2$, said glass being photosensitively opacifiable.

3. A reduced glass comprising essentially 70% to 85% $SiO_2$, 9% to 15% $Li_2O$, up to 8% $K_2O$, and 0.001% to 0.020% of silver computed as AgCl, the essential constituents totaling at least 84%, said glass being photosensitively opacifiable.

4. A reduced glass comprising essentially 70% to 85% $SiO_2$, 9% to 15% $Li_2O$, up to 8% $K_2O$, and 0.001% to 0.020% of silver computed as AgCl, the essential constituents totaling at least 84%, and up to 10% $Al_2O_3$ and up to 0.05% $CeO_2$, said glass being photosensitively opacifiable.

5. A reduced glass consisting essentially of 78% to 83% $SiO_2$, 10% to 13% $Li_2O$, 2% to 5% $K_2O$, up to 10% $Al_2O_3$, 0.001% to 0.020% of silver computed as AgCl and 0.005% to 0.05% $CeO_2$, said glass being photosensitively opacifiable.

6. A reduced glass comprising essentially 70-85% $SiO_2$, 9-15% $Li_2O$, the indicated proportion of at least one alkali metal oxide selected from the group consisting of up to 8% $Na_2O$, up to 8% $K_2O$ and up to 8% of a mixture of $Na_2O$ and $K_2O$, the total alkali metal oxide content being 9% to 23%, and 0.001% to 0.020% of silver computed as AgCl, the essential constituents totaling at least 84%, and up to 10% $Al_2O_3$, said glass being photosensitively opacifiable.

7. A reduced glass comprising essentially 70-85% $SiO_2$, 9-15% $Li_2O$, the indicated proportion of at least one alkali metal oxide selected from the group consisting of up to 8% $Na_2O$, up to 8% $K_2O$ and up to 8% of a mixture of $Na_2O$ and $K_2O$, the total alkali metal oxide content being 9% to 23%, and 0.001% to 0.020% of silver computed as AgCl, the essential constituents totaling at least 84%, and up to 0.05% $CeO_2$, said glass being photosensitively opacifiable.

8. A reduced glass comprising essentially 70% to 85% $SiO_2$, 9% to 15% $Li_2O$, up to 8% $K_2O$, and 0.001% to 0.020% of silver computed as AgCl, the essential constituents totaling at least 84%, and up to 10% $Al_2O_3$, said glass being photosensitively opacifiable.

9. A reduced glass comprising essentially 70% to 85% $SiO_2$, 9% to 15% $Li_2O$, up to 8% $K_2O$, and 0.001% to 0.020% of silver computed as AgCl, the essential constituents totaling at least 84%, and up to 0.05% $CeO_2$, said glass being photosensitively opacifiable.

10. A reduced glass comprising essentially 70-85% $SiO_2$, 9-15% $Li_2O$, and 0.001% to 0.020% of silver computed as AgCl, the essential constituents totalling at least 84%, said glass being photosensitively opacifiable.

11. A reduced glass comprising essentially 70-85% $SiO_2$, 9-15% $Li_2O$, and 0.001% to 0.020% of silver computed as AgCl, the essential constituents totalling at least 84%, and up to 0.05% $CeO_2$, said glass being photosensitively opacifiable.

12. A reduced glass comprising essentially 70-85% $SiO_2$, 9-15% $Li_2O$, and 0.001% to 0.020% of silver computed as AgCl, the essential constituents totalling at least 84%, and up to 10% $Al_2O_3$, said glass being photosensitively opacifiable.

13. A reduced glass comprising essentially 70-85% $SiO_2$, 9-15% $Li_2O$, and 0.001% to 0.020% of silver computed as AgCl, the essential constituents totalling at least 84%, and up to 10% $Al_2O_3$ and up to 0.05% $CeO_2$, said glass being photosensitively opacifiable.

References Cited in the file of this patent

UNITED STATES PATENTS

| Number | Name | Date |
| --- | --- | --- |
| 2,370,214 | Walker | Feb. 27, 1945 |
| 2,377,062 | Adams | May 29, 1945 |
| 2,515,939 | Stookey | July 18, 1950 |
| 2,515,940 | Stookey | July 18, 1950 |
| 2,515,942 | Stookey | July 18, 1950 |